UNITED STATES PATENT OFFICE.

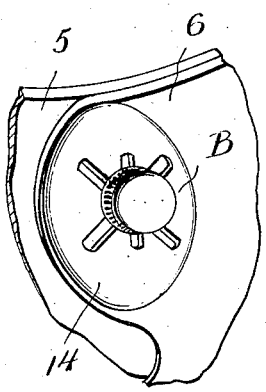
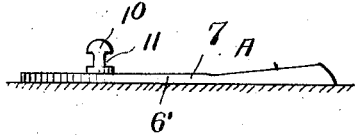
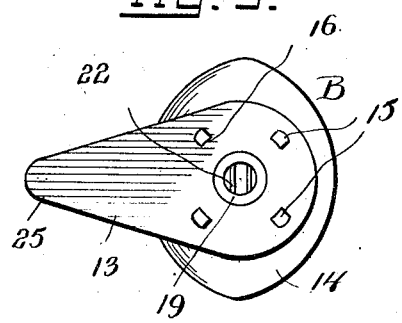
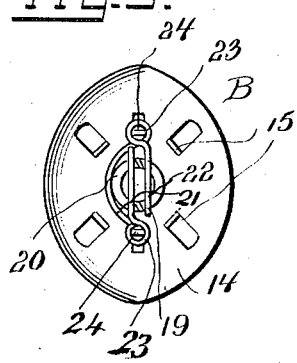
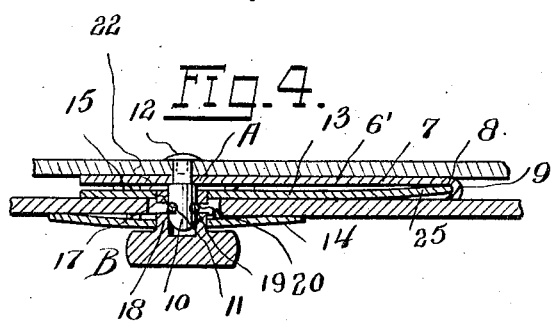

HERMAN RIGERT, OF OKLAHOMA, OKLAHOMA.

FASTENER.

1,083,139.  Specification of Letters Patent.  Patented Dec. 30, 1913.

Application filed November 15, 1912.  Serial No. 731,579.

*To all whom it may concern:*

Be it known that I, HERMAN RIGERT, who have applied to be a citizen of the United States, residing at Oklahoma city, in the county of Oklahoma and State of Oklahoma, have invented new and useful Improvements in Fasteners, of which the following is a specification.

The invention relates to a fastener and more particularly to the class of snap or stud and socket fasteners for shoes, gloves, wrist bands or other articles.

The primary object of the invention is the provision of a fastener of this character which can be opened or closed in a ready and quick manner requiring only the use of one hand for the unfastening of the same.

Another object of the invention is the provision of a fastener of this character in which the strain thereon is relieved so as to avoid the possibility of the accidental unfastening thereof.

A further object of the invention is the provision of a fastener wherein the same may be locked by readily snapping the same to the stud or post forming a part of the fastener.

A still further object of the invention is the provision of a fastener which is extremely simple in construction, thoroughly reliable and efficient in its purpose, readily and easily fastened and unfastened and also one which is inexpensive in manufacture.

With these and other objects in view the invention consists in the construction, combination and arrangement of parts as will be hereinafter more fully described, illustrated in the accompanying drawings, and pointed out in the claim hereunto appended.

In the drawings: Figure 1 is a fragmentary perspective view of a shoe upper showing the fasteners constructed in accordance with the invention mounted thereon and in locked position. Fig. 2 is a side view of the stud member of the fastener. Fig. 3 is a plan view looking toward the inner side of the socket member of the fastener. Fig. 4 is a vertical sectional view through the fastener when locked. Fig. 5 is a plan view of the fastener with the inner plate removed.

Similar reference characters indicate corresponding parts throughout the several views in the drawings.

Referring to the drawings by numerals 5 and 6 designate the sections of a shoe upper of the ordinary well-known construction which is merely shown for the purpose of illustration of the mounting and manner of use of the fastener hereinafter more fully described. It is of course to be understood that the fastener may be applied to any article where the same is required.

The fastener comprises stud and socket members A and B respectively, both of which are adapted to be fastened or mounted upon the respective sections 5 and 6 of the shoe upper or other article. The stud member A is formed with a base 6' having an extension 7 which is outwardly tapered and is instruck to form a seat 8 with an overhanging lip 9 at the free end of said extension. Mounted in the base plate 6' and projecting outwardly therefrom is an internally threaded hollow post or stud 10, the same being formed with a groove 11 in which are adapted to engage the catch members of the socket member B hereinafter described. Detachably engaged in the hollow post or stud 10 is a head shank 12 which is designed to fasten the stud member A to one of the sections of the shoe upper as shown.

The socket member comprises inner and outer plates 13 and 14 respectively, the said outer plate being formed with bendable tongues 15, while the inner plate is provided with a plurality of openings 16 through which are passed the tongues 15, the latter being pinched for the secure fastening of the plates at opposite sides of the other section of the shoe upper or other article to which the socket member is to be attached. The outer and inner plates 13 and 14 are formed with central openings 17 adapted to aline with each other in which is rotatably received the neck portion 18 of a hollow body or casing 19, which may be of any desired shape, although in this instance is preferably of circular formation, the necks 18 being formed with diametrically opposed slots 20 in which are received resilient arms 21 forming catch members which are the ends of a loop spring wire 22, the same being bent to form coils 23 engaged upon lugs 24 instruck from the outer plate 13, these lugs being disposed at opposite sides of the central opening therein, and are designed to prevent displacement of the spring wire 22, so that the catches 21 will work in the slots 20 for the snapping of the same in the groove 11 in the stud 10 of the stud member A on the insertion of the latter in the socket member B for connecting the same together. When it is desired to release the socket member B from the stud member A, it is only necessary to turn the body or casing 19 and the catch members 21 will be spread apart thereby disengaging the same from the groove 11 in the stud 10, thereby freeing the same from locked engagement in the casing 19 so that the stud and socket members can be separated.

Formed on the inner plate 13 is a finger extension 25, the free end of which is adapted to engage in the seat 8 under the lip 9 on the extension 7 when the stud and socket members are being locked together so that the strain upon the stud 10 and the catch members 21 respectively will be relieved therefrom, the finger extension 25 serving as a fulcrum for the socket member when being brought into locking engagement with the stud member. From the foregoing description, taken in connection with the accompanying drawings it is thought that the construction and operation of the invention will be clearly understood, and therefore, a more extended explanation has been omitted.

What is claimed is:

A fastener comprising a stud member, a socket member engageable with the stud member and including a base plate, ears struck from the base plate, a head having a stem rotatably mounted in the base, the said stem being provided with slots at diametrically opposite points thereof, and a spring having its ends working in the said slots and provided with loop portions engaging the said ears and also provided with an outwardly bowed portion partially encircling the said stem.

In testimony whereof I affix my signature in presence of two witnesses.

HERMAN RIGERT.

Witnesses:
 A. KELLER,
 ALBERT REY.

---

Copies of this patent may be obtained for five cents each, by addressing the "Commissioner of Patents, Washington, D. C."